G. HAGBERG.
FRICTION BRAKE TO PREVENT SIDE MOTION OF CARS.
APPLICATION FILED JULY 15, 1908.
912,121.
Patented Feb. 9, 1909.
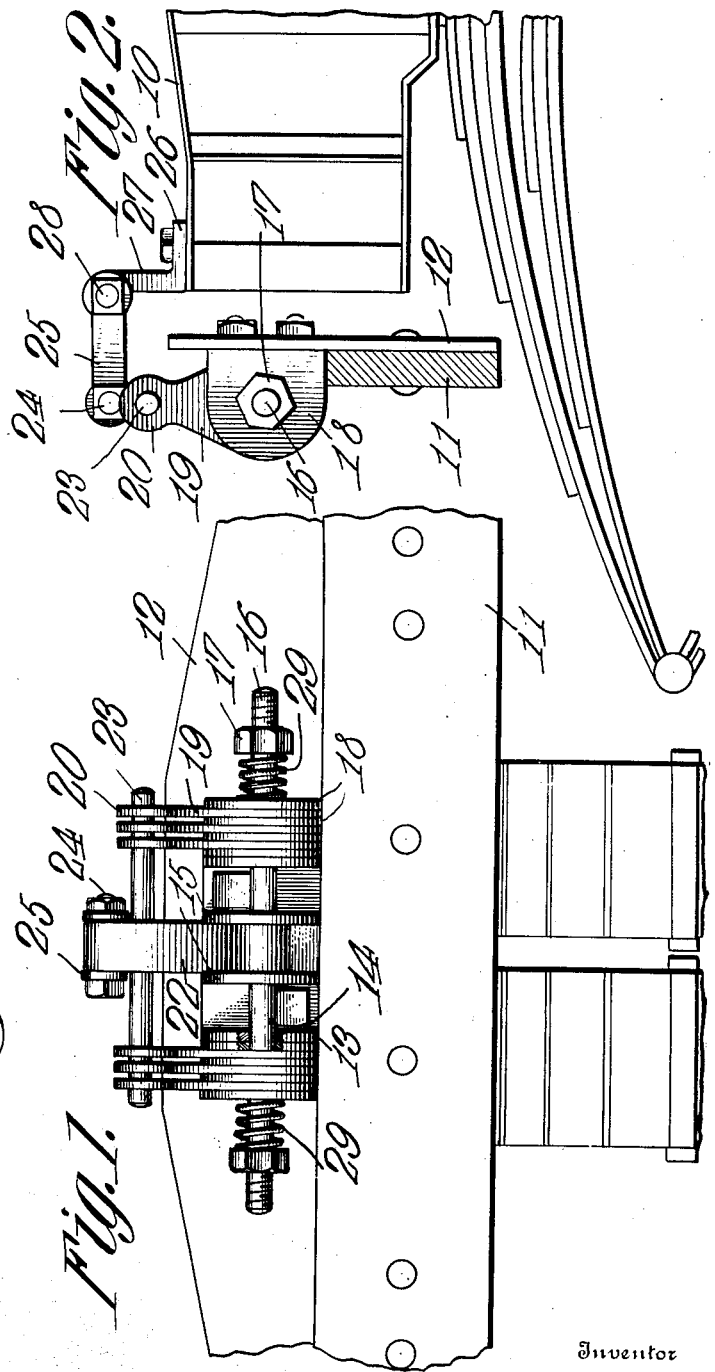

UNITED STATES PATENT OFFICE.

GUST HAGBERG, OF MARS, PENNSYLVANIA.

FRICTION-BRAKE TO PREVENT SIDE MOTION OF CARS.

No. 912,121.     Specification of Letters Patent.     Patented Feb. 9, 1909.

Application filed July 15, 1908. Serial No. 443,697.

*To all whom it may concern:*

Be it known that I, GUST HAGBERG, a citizen of the United States, residing at Mars, in the county of Butler and State of Pennsylvania, have invented a new and useful Friction-Brake to Prevent Side Motion of Cars, of which the following is a specification.

This invention relates to devices to prevent the side motion of cars relative to the trucks.

The invention consists in general of a friction brake mounted upon the truck frame and operatively connected to the truck bolster of a car.

The principal object of the invention is to provide a friction brake which shall eliminate and check the side swinging of railroad cars when going around a curve and which shall further make the vibration due to running over rough tracks of less magnitude and of smoother movement.

With the above and other objects in view the invention further consists in certain novel details of arrangement and combinations of parts hereinafter fully described, illustrated in the accompanying drawings, and specifically set forth in the claims.

In the accompanying drawings, like characters of reference indicate like parts in the several views, and Figure 1 is a side elevation of a portion of a car truck showing the truck frame and bolster and the present invention applied thereto. Fig. 2 is a similar view showing the device at right angles to Fig. 1. Fig. 3 is a perspective view of one of the stationary friction plates used in connection with this device. Fig. 4 is a similar view to Fig. 3 showing one of the movable friction plates.

In the present showing the numeral 10 indicates the truck bolster of a car and the numeral 11 a portion of the truck frame, this being shown as of a street car type in the present instance although any other frame may be used. Upon the truck 11 is a plate 12 whereto is rigidly attached a pair of ears 13 each centrally perforated as indicated at 14. A second pair of ears 15 is also provided for purposes hereinafter to be described and there is in each of these ears a perforation arranged to register with the perforation 14 of the ears 13. Through the ears 13 and 15 extends a bolt 16 preferably threaded at both ends and provided with suitable nuts 17.

Mounted upon the bolt 16 on the outside of each of the ears 13 is a series of friction plates of different forms, one of the forms being numbered 18 and the other 19. Each of these forms is provided with a suitable perforation to receive the bolt 16 and in the form shown at 19, there is provided in addition an ear 20 through which passes a perforation 21. An actuating lever 22 is mounted on the bolt 16 and is provided at its outer end with a cross bar 23 which passes through the perforations 21 of the friction plates 19. Pivotally connected to the outer end of this lever by a bolt 24 is a pair of links 25. A casting 26 is mounted upon the truck bolster 10 and is provided with an upwardly extending arm 27 which is pivoted to the free end of the link 25 by a bolt 28.

Mounted on the bolt 16 between the nut 17 and the friction plate is a pair of springs 29. By means of the springs 29 and the nuts 17, the required degree of friction may be obtained between the plate 18 and plate 19 so that the proper amount of resistance may be given to the movement of the lever 22, which in turn will control the amount of side play of the body bolster 10.

In the operation of this device when the car passes around a curve, the friction between the plates 18 and 19 will resist any tendency of the bolster to slide bodily transverse of the truck. At the same time if the car passes over a crossing or other rough place on the track, the peculiar arrangement of the links will permit the free action of the springs since the position of those links is such that the up and down movement of the car is permitted by the springs and is only accompanied by a slight movement of the friction plate 19 on the plate 18, it being noted that the latter are provided with square lower edges which contact with the frame 12 to prevent their rotation. Further by reason of this slight movement a certain amount of the shock will be absorbed and the movement take place through a longer period of time and any violent oscillation be prevented thereby.

It is obvious that many minor changes may be made in the form and arrangement of this device as well as the place to which it is applied without departing from the material principles thereof. It is not therefore desired to confine the invention to the exact form herein shown and described, but it is wished to include all such as properly come within the scope thereof.

Having thus described the invention what is claimed as new, is:—

1. In a car, a truck frame, a truck bolster, a friction brake mounted on the truck, a lever operatively connected to the movable member of the brake, and a link connecting the lever with the bolster.

2. In a device of the kind described, a frame, an ear rigidly attached thereto and provided with an opening, a bolt held in said opening, a series of friction plates held upon said bolt alternately rotatable and immovable, means to regulate the pressure between the rotatable and immovable plates, and other means connected to the rotatable plate to operatively connect the same to an element to limit the motion by the friction of the plates.

3. In a car, a truck frame, a truck bolster, a frame mounted on said truck, an ear rigidly attached thereto and provided with an opening, a bolt held in said opening, a series of friction plates held upon said bolt alternately rotatable and immovable, means to regulate the pressure between the rotatable and immovable plates, and other means connected to the rotatable plates to operatively connect the same to the bolster to limit its motion by the friction of the plates.

4. In a car, a truck frame, a truck bolster, a frame, a pair of spaced ears rigidly attached thereto and provided with openings therethrough, a bolt held in said openings, a series of friction plates held upon said bolt outside of each of said ears alternately rotatable and immovable, means to regulate the pressure between the rotatable and immovable plates, and other means connected to the rotatable plates to operatively connect the same to the bolster to limit its motion by the friction of the plates.

5. In a car, a truck frame, a truck bolster, a frame, a pair of ears rigidly attached thereto and provided with openings, a bolt held in said openings, a series of friction plates held upon said bolt outside each of said ears, a second series of friction plates interposed between the plates of the first series and provided with outwardly extending lugs having a perforation therethrough, a lever pivotally mounted upon said bolt provided with a cross bar extending through the perforations in the lugs of the second series of friction plates, a casting mounted upon the bolster in rigid position thereto, and a pair of links pivotally connected to the pivot casting and the outer end of said lever.

In testimony that I claim the foregoing as my own, I have hereto affixed my signature in the presence of two witnesses.

GUST HAGBERG.

Witnesses:
G. E. HAGBERG,
M. K. JORDAN.